United States Patent
Qian et al.

(10) Patent No.: US 10,649,803 B2
(45) Date of Patent: May 12, 2020

(54) HYPERVISOR RESTART HANDLING MECHANISM USING RANDOM SESSION NUMBERS

(71) Applicant: Nicira, Inc., Palo Alto, CA (US)

(72) Inventors: Bin Qian, San Jose, CA (US); Amit Chopra, Sunnyvale, CA (US); Dexiang Wang, Sunnyvale, CA (US); Chen Li, Sunnyvale, CA (US); Feng Pan, Beijing (CN); Jianjun Shen, Palo Alto, CA (US); Aayush Saxena, San Jose, CA (US); Yang Ping, San Jose, CA (US)

(73) Assignee: Nicira, Inc, Palo Alto, CA (US)

( * ) Notice: Subject to any disclaimer, the term of this patent is extended or adjusted under 35 U.S.C. 154(b) by 230 days.

(21) Appl. No.: 15/938,763

(22) Filed: Mar. 28, 2018

(65) Prior Publication Data
US 2019/0303186 A1 Oct. 3, 2019

(51) Int. Cl.
G06F 9/455 (2018.01)
H04L 29/06 (2006.01)

(52) U.S. Cl.
CPC .......... *G06F 9/45558* (2013.01); *H04L 63/20* (2013.01); *G06F 2009/4557* (2013.01); *G06F 2009/45587* (2013.01); *G06F 2009/45595* (2013.01)

(58) Field of Classification Search
CPC ....... G06F 9/45558; G06F 2009/45587; G06F 2009/45595; G06F 2009/4557; G06F 9/45533; G06F 11/07; G06F 21/575; G06F 21/62; G06F 21/6236; H04L 63/20
See application file for complete search history.

(56) References Cited

U.S. PATENT DOCUMENTS 10,083,026 B1 * 9/2018 Venkata .................... G06F 8/65

* cited by examiner

*Primary Examiner* — Sisley N Kim
(74) *Attorney, Agent, or Firm* — Patterson + Sheridan, LLP

(57) ABSTRACT

Certain embodiments described herein are generally directed to handling a hypervisor restart event in a distributed network system. Embodiments include receiving, by a central controller, a session identifier from a first hypervisor. Embodiments further include comparing, by the central controller, the session identifier to a stored session identifier associated with the first hypervisor. Embodiments further include determining, by the central controller based on the session identifier not matching the stored session identifier associated with the first hypervisor, that the first hypervisor has restarted. Embodiments further include updating, by the central controller, the stored session identifier associated with the first hypervisor to match the session identifier. Embodiments further include identifying, by the central controller, a second hypervisor that is associated with the first hypervisor. Embodiments further include sending, by the central controller, a notification to the second hypervisor that the first hypervisor has restarted.

21 Claims, 4 Drawing Sheets

HYPERVISOR RESTART HANDLING MECHANISM USING RANDOM SESSION NUMBERS

BACKGROUND

Software-defined networking (SDN) systems often include a plurality of physical host machines hosting hypervisors that run a plurality of virtual machines (VMs) (or other virtual computing instances, such as containers (e.g., Docker containers, data compute nodes, isolated user space instances, namespace containers). The VMs may be interconnected as part of a logical network configured by a network controller. Hypervisors generally communicate with a controller cluster (also referred to as a central control plane (CCP)) to send and receive control messages, such as via a local control plane (LCP) that is part of the hypervisor. Generally, there are no direct channels for communicating control messages directly between hypervisors. However, there are circumstances in which one or more hypervisors need to react to a hypervisor restart event that happens on another host (e.g., a restart event resulting from a hypervisor crash on the other host). One such circumstance arises in the context of distributed network encryption (DNE).

DNE techniques generally involve security associations established between hypervisors using mutually agreed-upon keys (e.g., encryption/decryption keys), security protocols, and/or security parameter index (SPI) values. Once a security association is established between two hypervisors, they may communicate securely with one another using the keys, protocols, and/or SPI values. However, if a hypervisor restarts, any other hypervisors that share a security association with the hypervisor need to be notified of the restart event so that new security associations may be established. Because there generally are no direct control messaging channels between hypervisors, the restarted hypervisor has no way of directly messaging other hypervisors after a hypervisor restart event such as to initiate procedures for establishing new security associations.

SUMMARY

Herein described are one or more embodiments of a method for handling a hypervisor restart event in a distributed network system. The method generally includes receiving, by a central controller, a session identifier from a first hypervisor. The method further includes comparing, by the central controller, the received session identifier to a stored session identifier associated with the first hypervisor. The method further includes determining, by the central controller based on the received session identifier not matching the stored session identifier, that the first hypervisor has restarted. The method further includes updating, by the central controller, the stored session identifier associated with the first hypervisor to match the received session identifier. The method further includes identifying, by the central controller, a second hypervisor that is associated with the first hypervisor. The method further includes sending, by the central controller, a notification to the second hypervisor that the first hypervisor has restarted.

Also described herein are embodiments of a computer system, wherein software for the computer system is programmed to execute the method described above for handling a hypervisor restart event in a distributed network system.

Also described herein are embodiments of a non-transitory computer readable medium comprising instructions to be executed in a computer system, wherein the instructions when executed in the computer system perform the method described above for handling a hypervisor restart event in a distributed network system.

DETAILED DESCRIPTION

Embodiments presented herein relate to systems and methods for hypervisor restart handling using random session numbers. Techniques described herein involve the use of randomly generated numbers as session identifiers for sessions between hypervisors and a central control plane (CCP). In certain embodiments, when a hypervisor restarts, it generates a new session identifier and sends the new session identifier to the CCP, which may determine that the hypervisor has restarted based on the new session identifier. The CCP may then identify other hypervisors that are associated with the hypervisor (e.g., hypervisors that share a security policy with the hypervisor), and notify the identified other hypervisors that the hypervisor has restarted. The other hypervisors may react to the hypervisor restart event as applicable (e.g., by re-establishing a security association with the hypervisor). In this specification, the terms "logical network entity," "logical network element," and the like will refer to software defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

It is noted that, while certain embodiments are described with respect to hypervisors, techniques described herein may also be performed by other entities running on host machines rather than hypervisors without departing from the scope of the present disclosure.

Figure 1:
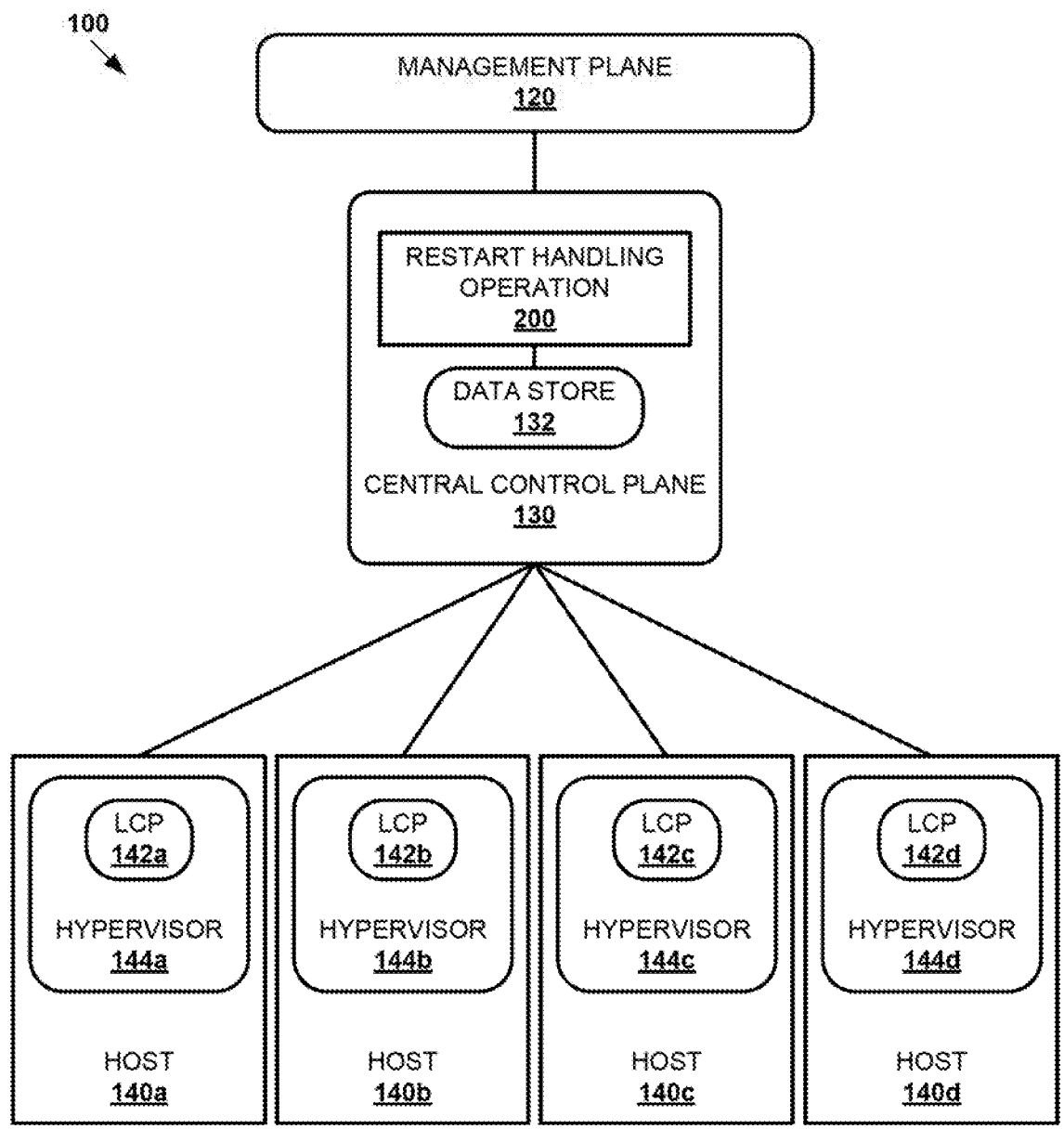
FIG. 1 is a block diagram of a network control system within which embodiments of the present disclosure may be implemented.

FIG. 1 is a block diagram of a network control system 100 including a CCP 130 (i.e., comprising one or more network controllers) that implements embodiments described herein. As shown, network control system 100 includes a management plane 120, a CCP 130, and multiple local controllers (also called the LCP) 142a-d that operate on hosts 140a-d, respectively. In addition, each host 140a-d includes a hypervisor 144a-d that serves as an interface between one or more virtual machines (not shown) that may be running on the host and a physical network interface card (PNIC) (not shown) of the host, as well as other physical resources available on the host. Each LCP 142a-d may communicate with CCP 130 over a network via a PNIC of the host 140a-d running the LCP 142a-d.

Though shown as single units, it should be understood that both management plane 120 and CCP 130 may be implemented as distributed or clustered systems. That is, management plane 120 may include multiple computing devices that implement management plane functions, and a CCP 130 may include multiple central controller computers, virtual machines or other virtual computing instances that implement CCP functions. In some embodiments, each central controller computer(s) implements both management plane and central control plane functions (e.g., as separate applications or functions).

In some embodiments, management plane 120 is responsible for receiving logical network configuration data (e.g., through an application programming interface). Alternatively, users (e.g., network administrators) may enter configuration data associated with a logical network through a command-line interface or a graphical user interface. The logical network, also referred to as a "logical overlay network" or "software defined network (SDN)" may include logical networking elements.

Logical network elements such as logical switches and logical routers are decoupled from the underlying physical network infrastructure by way of network tunneling between hosts. Thus, any arbitrary set of VMs in a datacenter may be placed in communication across a logical Layer 2 network by connecting them to a logical switch. The logical switch is collectively implemented by virtual switches on each host that has a VM connected to the logical network. The virtual switch on each host operates as a managed edge switch implemented in software by the hypervisor on each host. Forwarding tables at the virtual switches instruct the host to encapsulate packets, using a tunnel endpoint (TEP) from a participating VM to another VM on the logical network but on a different (destination) host with an outer IP header addressed to the destination host using a mapping of VM IP addresses to host IP addresses. At the destination host, a second tunnel endpoint decapsulates the packet and then directs the packet to the destination VM. Logical routers extend the logical network across subnets or other network boundaries using IP routing in the logical domain. Distributed network encryption (DNE) adds the capability of encrypting VM traffic between hosts according to an encryption policy. Further details of an example logical overlay network and SDN architecture is provided in U.S. Pat. No. 9,792,447, issued Oct. 17, 2017, which is hereby incorporated herein in its entirety by reference.

Configuration data may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc. Each of these pieces of configuration data, including logical networking elements, service rules, rule sets, and the like, may be referred to as a logical entity.

Management plane 120 receives logical network configuration data and generates desired state data that specifies how the logical network should be implemented in the physical infrastructure. When users provide configuration changes (e.g., creating or deleting logical entities, modifying properties of logical entities, changing relationships between logical entities, etc.), the changes to the desired state are distributed as logical network updates to CCP 130.

CCP 130 receives updates from management plane 120, and is responsible for distributing the updates as control messages (e.g., state updates) to the hypervisors 144a-d that it manages (e.g., via LCPs 142a-d). In some embodiments, CCP 130 comprises a CCP cluster of controllers, with each controller in the cluster managing a different subset of hypervisors 144a-d. In some embodiments, LCPs 142a-d are responsible for translating received control messages into configuration data formatted for their respective hypervisors 144a-d. In some embodiments, as shown, LCPs 142a-d operate in hypervisors 144a-144d, respectively. For example, an LCP 142a-d may be a daemon that operates in a hypervisor 144a-d. In other embodiments, an LCP 142a-d may operate within a VM that hosts multiple containers for one or more logical networks. In some such embodiments, a first LCP 142a-d operates in a hypervisor 144a-d while a second LCP 142a-d operates in the container host VM (or multiple such controllers/virtual entities operate in multiple container host VMs).

In certain embodiments, hypervisors 144a-d establish control sessions for receiving control messages from CCP 130, each hypervisor 144a-d generating a session identifier (e.g., randomly, pseudo-randomly, etc.) and sending the session identifier to CCP 130 via corresponding LCP 142a-d. CCP 130 may store associations between session IDs and hypervisors 144a-d in data store 132, which may comprise a repository or other data storage entity. For example, data store 132 may store associations between session IDs and hypervisor identifiers (e.g., MAC addresses, IP addresses, host names, or the like of the host running the hypervisor) of hypervisors 144a-d. In each control message (e.g., state update) sent from CCP 130 to a hypervisor 144a-d via corresponding LCP 142a-d, CCP 130 may include the applicable session ID for the hypervisor 144a-d in a header of the control message. A hypervisor 144a-d may use the session ID included in a received control message to ensure that the message is received from CCP 130 and that it applies to the current control session between the hypervisor and CCP 130.

In some embodiments, hypervisors 144a-d implement DNE techniques, which generally involve security associations being established between hypervisors as discussed. If a hypervisor 144a-d running on a host 140a-d restarts, any other hypervisors 144a-d that had previously established a security association with the restarted hypervisor must establish a new security association with the hypervisor following the restart. A hypervisor may restart due, for example, to a hypervisor crash, a hardware failure of the host running the hypervisor, or the like.

In certain embodiments of the present disclosure, when a hypervisor 144a-d restarts, the hypervisor 144a-d generates a new session ID, and sends the new session ID to CCP 130. Accordingly, CCP 130 may perform a restart handling operation 200 in order to provide a notification of the restart event to other hypervisors 144a-d running on other hosts 140a-d that may be affected by the restart. Restart handling operation 200 is described in more detail below with respect to FIG. 2.

Figure 2:
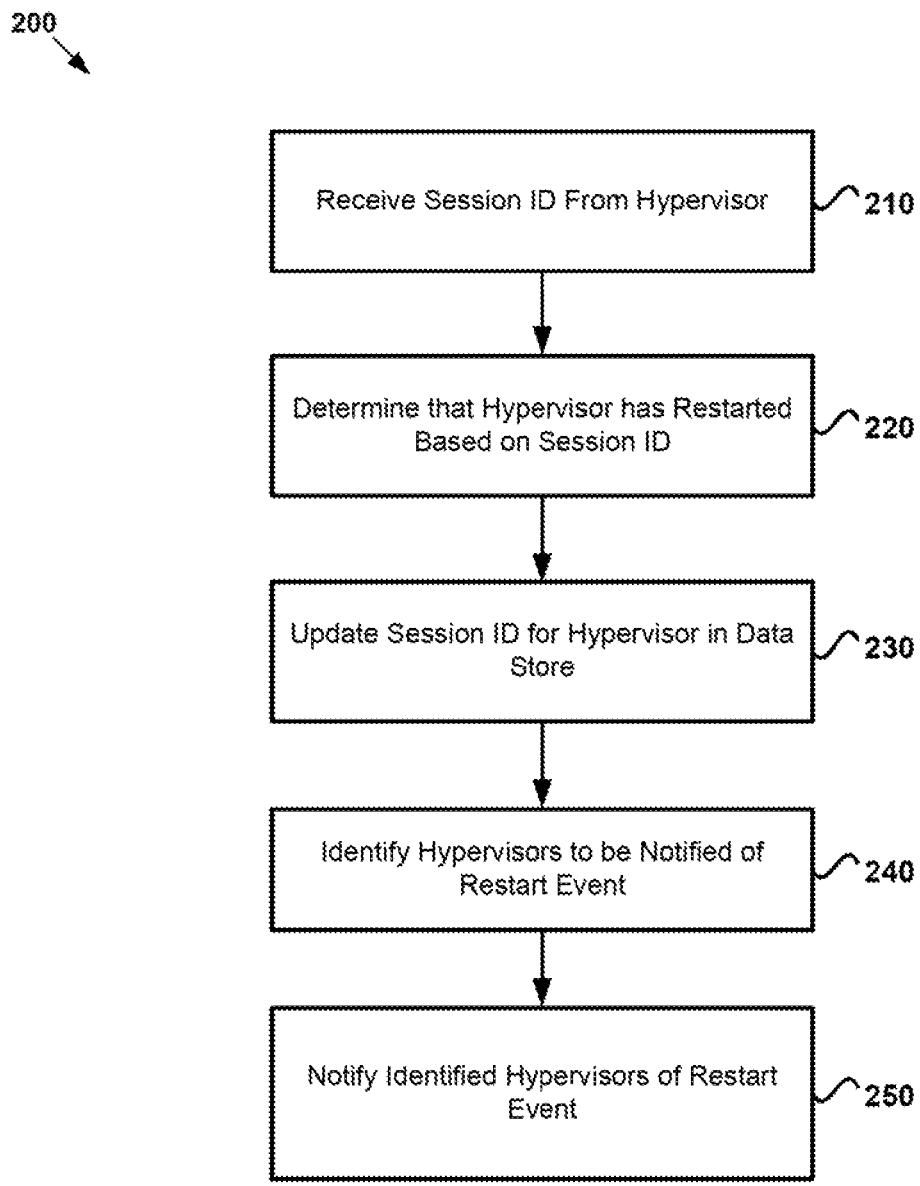
FIG. 2 illustrates an example restart handling operation according to certain embodiments.

FIG. 2 illustrates an example of a restart handling operation 200 according to embodiments of the present disclosure. For example, restart handling operation 200 may be implemented by CCP 130 of FIG. 1.

Restart handling operation 200 begins at step 210, where a session ID is received from a hypervisor (e.g., hypervisor 144a of FIG. 1) via a corresponding LCP (e.g., LCP 142a of FIG. 1). For example, hypervisor 144a may generate the session ID upon restarting, store the session ID locally, and send the session ID to CCP 130 via LCP 142a. In some embodiments, the hypervisor generates a random number for use as the session ID. In one example, a host boot timestamp (e.g., epoch time) of when a host running the hypervisor last booted is used as the session ID. The use of random session IDs that are generated independently by hypervisors, instead of being generated and managed by a centralized controller (e.g., CCP 130), avoids potential complexities of centralized system orchestration and coordination, thereby making the solution described herein more robust than conventional industry practices At step 220, it is determined that the hypervisor has restarted based on the session ID. For example, CCP 130 may compare the session ID received from hypervisor 144a to a previously stored session ID associated with hypervisor 144a in a data store (e.g., data store 132 of FIG. 1). CCP 130 may identify that the session ID received from hypervisor 144a does not match the stored session ID, and may thereby determine that hypervisor 144a has restarted and generated a new session ID.

At step 230, the session ID stored in the data store is replaced with the session ID received from the hypervisor. For example, CCP 130 may update its locally stored session ID associated with hypervisor 144a in data store 132 based on the session ID received from hypervisor 144a.

At step 240, hypervisors that should be notified of the restart event are identified. For example, CCP 130 may determine which hypervisors share a security policy, such as a security association in DNE, with hypervisor 144a, which has restarted. In some embodiments, CCP 130 may store (e.g., in data store 132) associations between hypervisors (or hosts running the hypervisors) and security policies, and may access these associations to identify hypervisors to be notified of the restart event.

At step 250, the identified hypervisors are notified of the restart event. For example, CCP 130 may send a notification to each of the hypervisors identified at step 240, the notification indicating that hypervisor 144a has restarted. In some embodiments, the notification comprises a control message.

Upon receiving a notification of a hypervisor restart event, a hypervisor may take action based on the restart event, as applicable. For example, if a hypervisor receives a notification that another hypervisor with which it has a security association has restarted, the hypervisor may clear the existing security association with the other hypervisor and establish a new security association with the other hypervisor. In DNE, a security association is generally a one-way or simplex connection, and therefore at least two security associations, one for each direction, are generally established between two hypervisors (e.g., the other hypervisor may respond by establishing a security association with the hypervisor).

Figure 3:
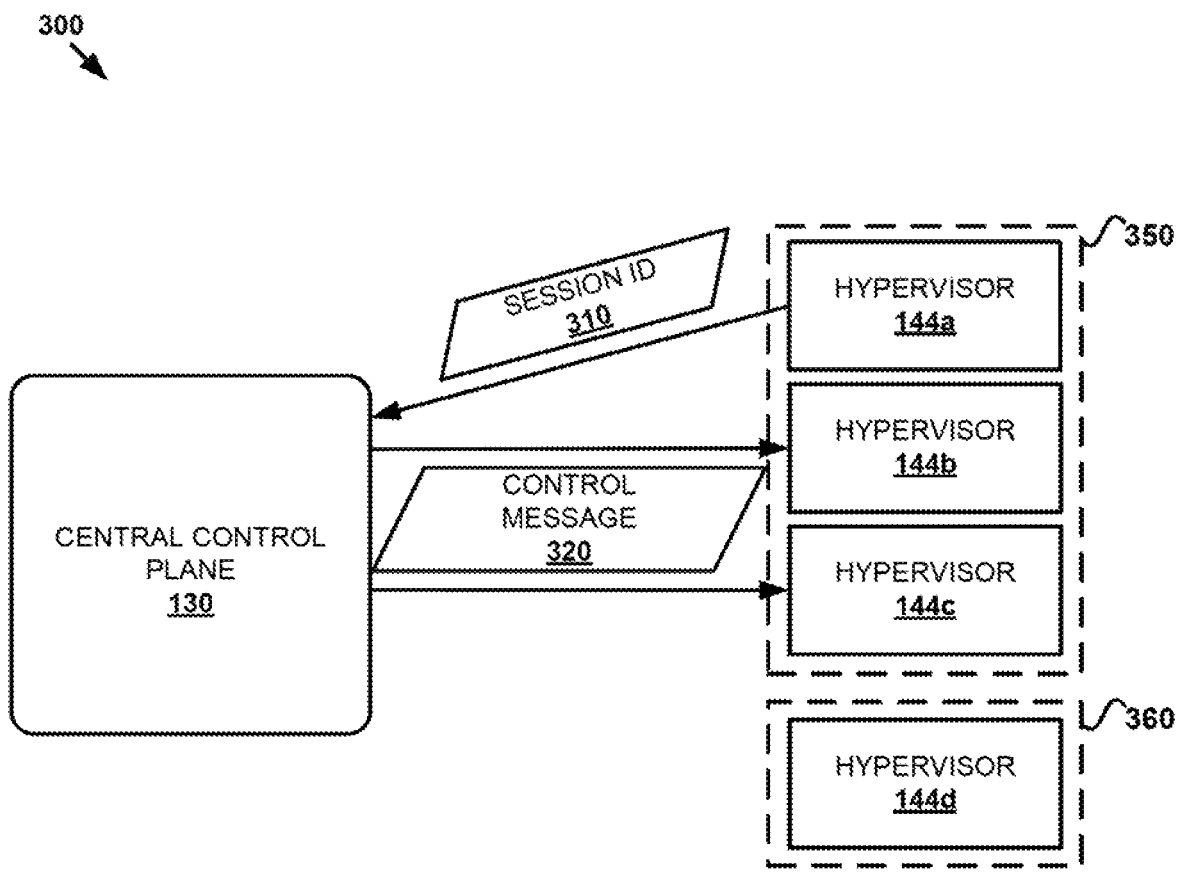
FIG. 3 illustrates hypervisor restart handling in a distributed system according to embodiments of the present disclosure.

FIG. 3 illustrates an example 300 of hypervisor restart handling according to embodiments of the present disclosure. As shown, example 300 includes CCP 130 and hypervisors 144a-d of FIG. 1.

As shown, hypervisor 144a sends a session ID 310 (e.g., generated by hypervisor 144a after a restart) to CCP 130. CCP 130 determines that hypervisor 144a has restarted based on the session ID, such as by comparing session ID 310 to a locally stored session ID associated with an identifier of hypervisor 144a. Upon determining that hypervisor 144a has restarted, CCP 130 identifies which hypervisors to notify of the restart event. In example 300, hypervisors 144a, 144b, and 144c share a security policy 350 (illustrated by the dotted line), while hypervisor 144d has a different security policy 360. CCP 130 may store associations between hypervisors and security policies, and may use these associations to determine which hypervisors share a security policy with hypervisor 144a.

CCP 130 determines that hypervisors 144b and 144c share a security policy 350 with hypervisor 144a, and accordingly identifies hypervisors 144b and 144c to be notified of the restart event. As such, CCP 130 sends a control message 320 to hypervisors 144b and 144c, control message 320 comprising a notification that hypervisor 144a has restarted. Upon receiving control message 320, each of hypervisors 144b and 144c may re-establish a security association with hypervisor 144a.

Figure 4:
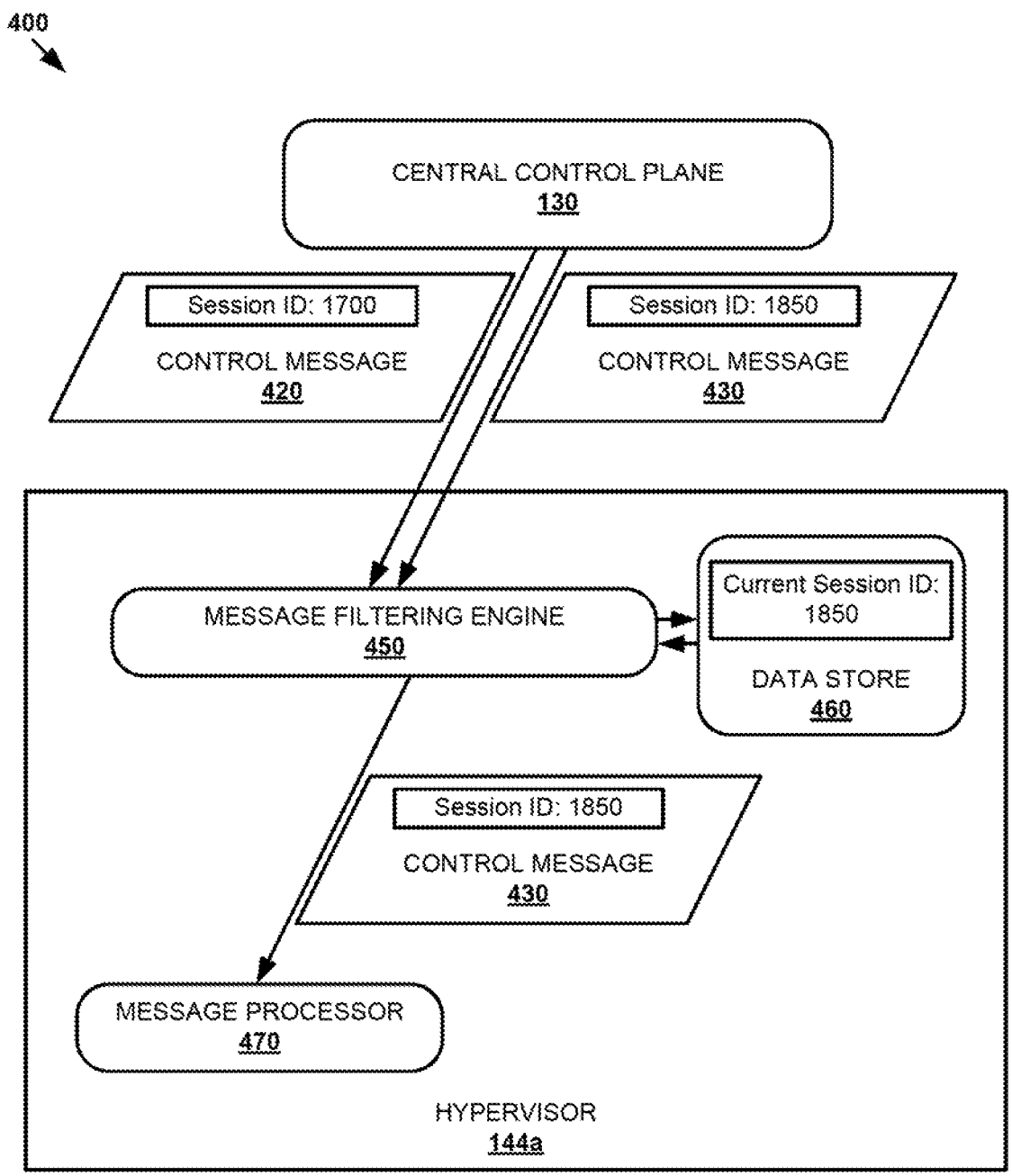
FIG. 4 illustrates message filtering based on session identifiers according to embodiments of the present disclosure.

FIG. 4 illustrates an example 400 of message filtering according to techniques described herein. As shown, example 400 includes CCP 130 and hypervisor 144a (of host 140a) of FIG. 1.

CCP 130 sends two control messages 420 and 430 to hypervisor 144a. Control messages 420 and 430 may, for example, comprise state updates sent by CCP 130 based on configuration changes forwarded to CCP 130 from management plane 120. Control message 420 includes a session ID of "1700" in a header, and control message 430 includes a session ID of "1850" in a header. For example, control message 420 may have been sent by CCP 130 before a restart of hypervisor 144a (e.g., before example 300 of FIG. 3) and control message 430 may have been sent by CCP 130 after the restart (e.g., after example 300 of FIG. 3). Control message 420 includes a previous session ID, "1700", which has been replaced with a new session ID, "1850", which was generated by hypervisor 144a after the restart. For example, control message 420 may have been delayed due to network latency and may be received by hypervisor 144a after the restart.

Hypervisor 144a receives control messages 420 and 430 via a message filtering engine 450, which may perform operations related to filtering of control messages based on session IDs. Message filtering engine 450 may ensure that each control message received contains the current session ID of the control session between hypervisor 144a and CCP 130, and may filter control messages that do not contain the current session ID. Message filtering engine 450 accesses the current session ID in a data store 460. Data store 460 may store the current session ID, which may be updated by hypervisor 144a every time a new session ID is generated, such as following a restart. In example 400, the current session ID is "1850". As such, message filtering engine 450 determines that control message 420 does not include the current session ID and that control message 430 does include the current session ID. Message filtering engine 450 therefore provides control message 430 to a message processor 470 for further processing and filters out control message 420 (e.g., by discarding control message 420). Message processor 470 is included to be representative of any operations performed to process control messages. For example, message processor 470 may process state updates that are described in control message 430, such as by creating or deleting virtual entities, modifying properties of virtual entities, changing relationships between virtual entities, and/or the like.

In some embodiments, hypervisor 144a may notify CCP 130 of its current session ID when it determines that it has received a control message that does not include the current session ID. For example, when message filtering engine 450 filters control message 420, it may respond to CCP 130 via corresponding LCP 142a with a notification that its current session ID is "1850". This may be advantageous in the event that CCP 130 has somehow not previously received the current session ID from hypervisor 144a or failed to appropriately update its locally stored session ID for its control session with hypervisor 144a.

Embodiments described herein (e.g., with respect to FIGS. 1-4) constitute an improvement with respect to conventional industry practices, as they allow for more effective identification and handling of hypervisor restart events in distributed systems. Utilizing a CCP to determine that a hypervisor has restarted based on a new session ID received from the hypervisor and to propagate the hypervisor restart event to other associated hypervisors improves the functioning of systems in which hypervisor restart events occur by decentralizing the generation of session IDs (thereby decreasing a processing load on the CCP) while allowing for hypervisor restart events to be appropriately distributed and handled. Notifying associated hypervisors of a hypervisor restart event allows the associated hypervisors to avoid performing additional processing to determine that the hypervisor has restarted, prevents inactive and unsecure connections, and prevents data loss. Message filtering based on session IDs according to techniques described herein allows hypervisors to efficiently avoid processing stale or irrelevant control messages received, and thereby improves data processing at hypervisors.

It is noted that DNE is only included as one example with which techniques described herein may be employed. Embodiments of the present disclosure may be advantageous in any system where a hypervisor restart or host restart affects other hypervisors or hosts.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for handling a hypervisor restart event in a distributed network system, the method comprising:
   receiving, by a central controller, a session identifier from a first hypervisor;
   comparing, by the central controller, the session identifier to a stored session identifier associated with the first hypervisor;
   determining, by the central controller based on the session identifier not matching the stored session identifier associated with the first hypervisor, that the first hypervisor has restarted;
   updating, by the central controller, the stored session identifier associated with the first hypervisor to match the session identifier;
   identifying, by the central controller, a second hypervisor that is associated with the first hypervisor;
   sending, by the central controller, a notification to the second hypervisor that the first hypervisor has restarted.

2. The method of claim 1, wherein identifying the second hypervisor that is associated with the first hypervisor comprises: determining that the first hypervisor shares a security policy with the second hypervisor.

3. The method of claim 2, wherein the second hypervisor, upon receiving the notification, removes an old security association with the first hypervisor and establishes a new security association with the first hypervisor.

4. The method of claim 2, wherein the security policy comprises a distributed networking encryption (DNE) policy.

5. The method of claim 1, further comprising:
   receiving, by the first hypervisor and from the central controller, a control message comprising a second session identifier in a header of the control message;
   comparing, by the first hypervisor, the second session identifier to the session identifier, wherein the session identifier is stored by the first hypervisor;
   determining, by the first hypervisor based on the comparing, that the second session identifier does not match the session identifier;
   discarding, by the first hypervisor, the control message based on the second session identifier not matching the session identifier.

6. The method of claim 5, further comprising:
   sending, by the first hypervisor and to the central controller, a notification of the session identifier.

7. The method of claim 1, wherein prior to receiving, by the central controller, the session identifier, the method further comprises:
   determining, by the first hypervisor, that the first hypervisor has restarted;
   generating, by the first hypervisor, the session identifier;
   sending, by the first hypervisor, the session identifier to the central controller.

8. A computer system comprising: one or more processors; and a non-transitory computer-readable medium storing instructions that, when executed, cause the one or more processors to perform a method for handling a hypervisor restart event in a distributed network system, the method comprising:
   receiving, by a central controller, a session identifier from a first hypervisor;
   comparing, by the central controller, the session identifier to a stored session identifier associated with the first hypervisor;
   determining, by the central controller based on the session identifier not matching the stored session identifier associated with the first hypervisor, that the first hypervisor has restarted;
   updating, by the central controller, the stored session identifier associated with the first hypervisor to match the session identifier;
   identifying, by the central controller, a second hypervisor that is associated with the first hypervisor;
   sending, by the central controller, a notification to the second hypervisor that the first hypervisor has restarted.

9. The system of claim 8, wherein identifying the second hypervisor that is associated with the first hypervisor comprises: determining that the first hypervisor shares a security policy with the second hypervisor.

10. The system of claim 9, wherein the second hypervisor, upon receiving the notification, removes an old security association with the first hypervisor and establishes a new security association with the first hypervisor.

11. The system of claim 9, wherein the security policy comprises a distributed networking encryption (DNE) policy.

12. The system of claim 8, wherein the method further comprises:
   receiving, by the first hypervisor and from the central controller, a control message comprising a second session identifier in a header of the control message;
   comparing, by the first hypervisor, the second session identifier to the session identifier, wherein the session identifier is stored by the first hypervisor;
   determining, by the first hypervisor based on the comparing, that the second session identifier does not match the session identifier;
   discarding, by the first hypervisor, the control message based on the second session identifier not matching the session identifier.

13. The system of claim 12, wherein the method further comprises:
   sending, by the first hypervisor and to the central controller, a notification of the session identifier.

14. The system of claim 8, wherein prior to receiving, by the central controller, the session identifier, the method further comprises:
   determining, by the first hypervisor, that the first hypervisor has restarted;
   generating, by the first hypervisor, the session identifier;
   sending, by the first hypervisor, the session identifier to the central controller.

15. A non-transitory computer readable medium comprising instructions to be executed in a computer system, wherein the instructions when executed in the computer system perform a method for handling a hypervisor restart event in a distributed network system, the method comprising:

receiving, by a central controller, a session identifier from a first hypervisor;

comparing, by the central controller, the session identifier to a stored session identifier associated with the first hypervisor;

determining, by the central controller based on the session identifier not matching the stored session identifier associated with the first hypervisor, that the first hypervisor has restarted;

updating, by the central controller, the stored session identifier associated with the first hypervisor to match the session identifier;

identifying, by the central controller, a second hypervisor that is associated with the first hypervisor;

sending, by the central controller, a notification to the second hypervisor that the first hypervisor has restarted.

16. The non-transitory computer readable medium of claim 15, wherein identifying the second hypervisor that is associated with the first hypervisor comprises: determining that the first hypervisor shares a security policy with the second hypervisor.

17. The non-transitory computer readable medium of claim 16, wherein the second hypervisor, upon receiving the notification, removes an old security association with the first hypervisor and establishes a new security association with the first hypervisor.

18. The non-transitory computer readable medium of claim 16, wherein the security policy comprises a distributed networking encryption (DNE) policy.

19. The non-transitory computer readable medium of claim 15, wherein the method further comprises:

receiving, by the first hypervisor and from the central controller, a control message comprising a second session identifier in a header of the control message;

comparing, by the first hypervisor, the second session identifier to the session identifier, wherein the session identifier is stored by the first hypervisor;

determining, by the first hypervisor based on the comparing, that the second session identifier does not match the session identifier;

discarding, by the first hypervisor, the control message based on the second session identifier not matching the session identifier.

20. The non-transitory computer readable medium of claim 19, wherein the method further comprises:

sending, by the first hypervisor and to the central controller, a notification of the session identifier.

21. The non-transitory computer readable medium of claim 15, wherein prior to receiving, by the central controller, the session identifier, the method further comprises:

determining, by the first hypervisor, that the first hypervisor has restarted;

generating, by the first hypervisor, the session identifier;

sending, by the first hypervisor, the session identifier to the central controller.

\* \* \* \* \*